United States Patent [19]

Simmons

[11] 3,871,103

[45] Mar. 18, 1975

[54] POWER SAW PRECISION STAIN GAUGE

[76] Inventor: Harold W. Simmons, 1545 S.W. 192nd St., Aloha, Oreg. 97006

[22] Filed: July 9, 1973

[21] Appl. No.: 377,232

[52] U.S. Cl. .................. 33/174 R, 33/75 R, 33/194, 83/745
[51] Int. Cl. ......................... E04f 21/26, G01b 5/14
[58] Field of Search ............ 33/194, 202, 174 R, 42, 33/75 R, 99, 100; 83/745

[56] References Cited
UNITED STATES PATENTS

| | | | |
|---|---|---|---|
| 2,773,523 | 12/1956 | Hopla | 83/74.5 |
| 2,976,899 | 3/1961 | Lane | 83/74.5 |
| 3,242,580 | 3/1966 | Cranford | 33/194 |

*Primary Examiner*—Richard E. Aegerter
*Assistant Examiner*—Steven L. Stephan
*Attorney, Agent, or Firm*—Clarence A. O'Brien; Harvey B. Jacobson

[57] ABSTRACT

A gauge for measuring stair treads and risers is provided comprising a telescopic framework, a pair of stationary members attached to opposite ends of the framework, and a movable member pivotally mounted to each stationary member and adapted to contact a stair skirt upon appropriate adjustment of the telescopic framework length, whereby the end dimensions of the stair tread or riser are determined. Each movable member may be swung upwardly and out of the way when making a cut with a portable power saw; the width of each movable member being equal to the dimension between the saw slide shoe edge and saw blade, with the shoe being guided by the edge of the stationary member to provide an accurate cut.

5 Claims, 7 Drawing Figures

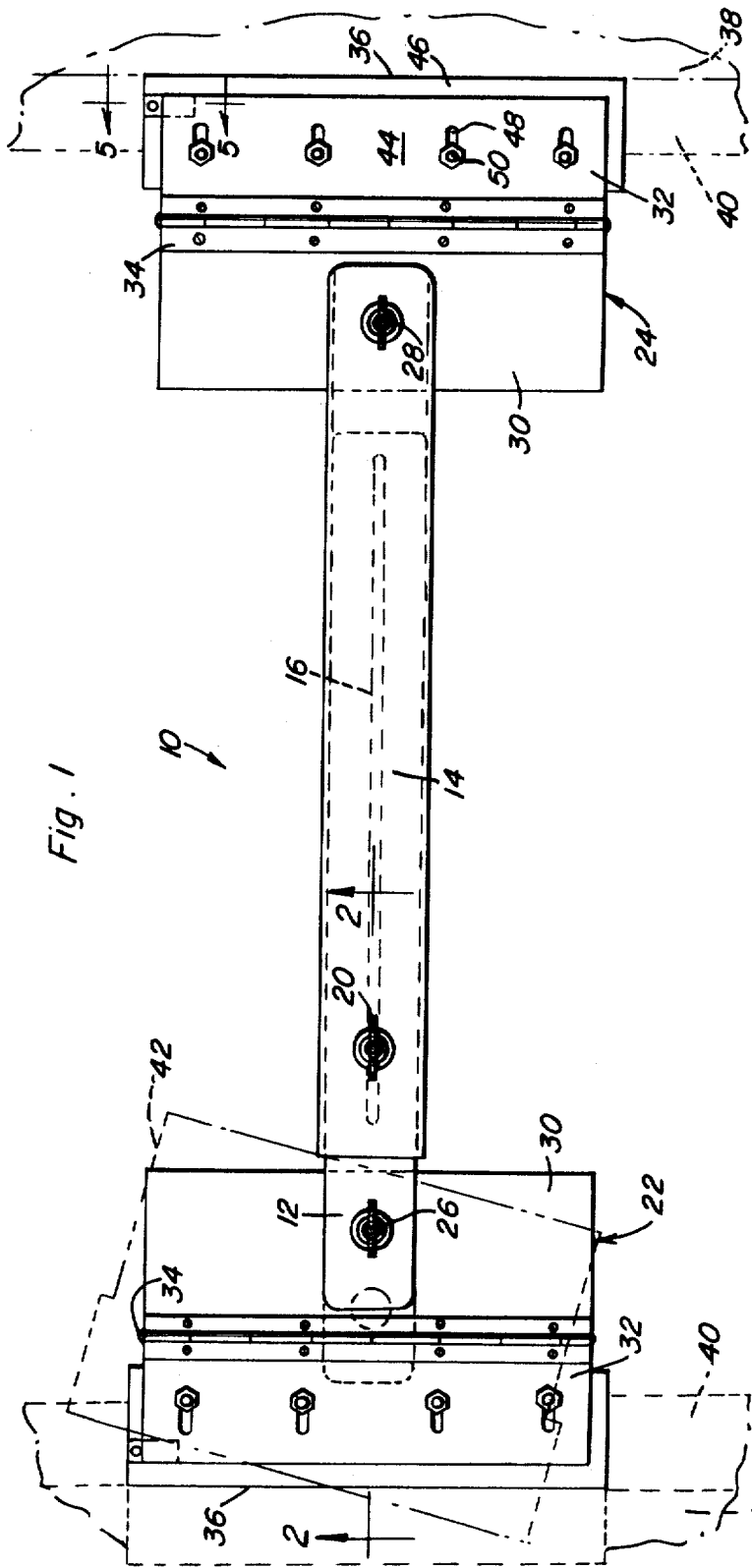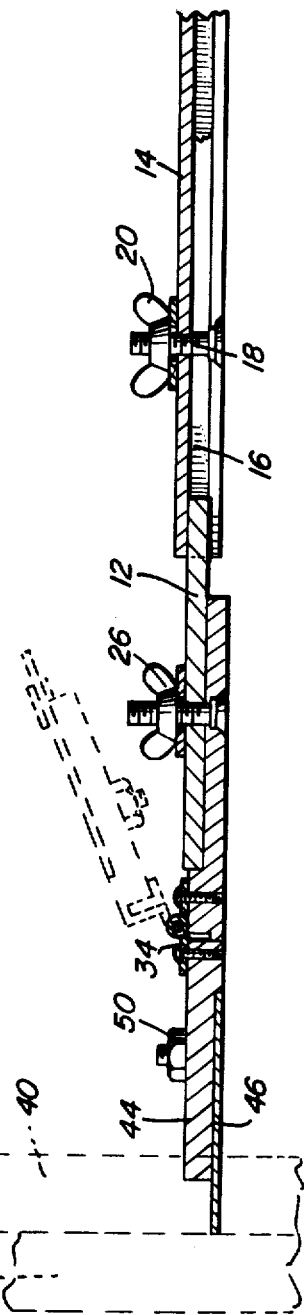

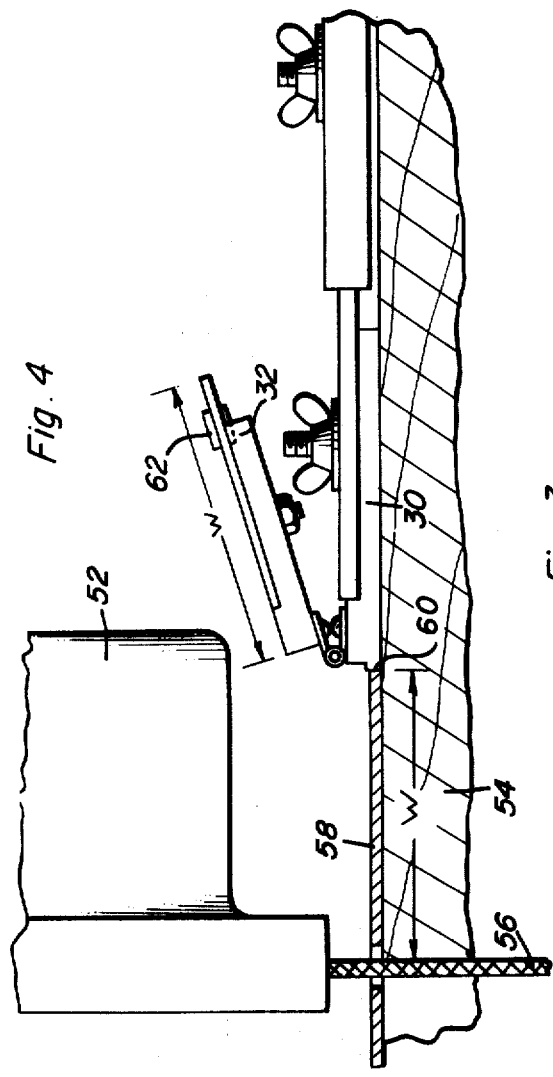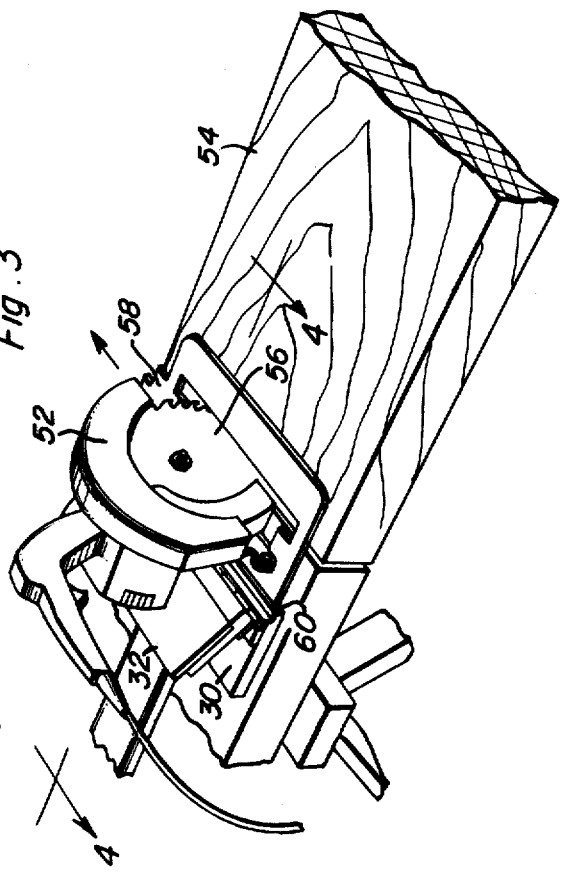

POWER SAW PRECISION STAIN GAUGE

The present invention is generally related to cutting gauges and, more particularly, to an improved stair tread and riser gauge.

In the past, various gauges have been proposed or manufactured for measuring stair treads and risers. One such gauge is disclosed by U.S. Pat. No. 3,242,580, issued Mar. 29, 1966 to Crawford. The Crawford gauge includes a pair of planar wooden members mounted to opposite ends of an arm which is adjustable in length. The Crawford gauge is adapted to be positioned between a pair of stair skirts and the arm length is adjusted to bring the outer edges of the planar members into contact with the skirts. The gauge is then removed and clamped to the board to be cut, whereby the edges of the planar members define the cutting lines for a portable saw having a shoe which slides over each planar member upon making a cut. A metal guide adjacent the slide shoe holds the saw on course during each cut. It is apparent that while the Crawford gauge may provide accurate cuts, the depth setting of the saw must be at least as great as the composite thickness of the planar wooden member and the workpiece being cut. This is important to note since most portable saws are limited to cutting depths of approximately 2 ½ inches. The thickness of Crawford's planar member limits the effective cutting depth to approximately 1 ¾ - 2 inches, making heavier cuts impossible. Furthermore, during each cut the slide shoe rubs over the surfaces of the planar wooden member, causing considerable wear over a period of time, necessitating periodic replacement of the planar member. The present invention will alleviate this problem in that the entire end section hinges up and out of the way.

It is an object of the present invention to provide an improved stair tread and riser gauge which overcomes the above-mentioned problems.

Another object of the present invention is to provide a novel stair tread and riser gauge which provides accurate cuts, but does not reduce the effective cutting depth of the portable saw being utilized.

It is a further object of the present invention to provide a versatile stair tread and riser gauge which includes a sizing member which may be easily swung up out of the way prior to making each cut, whereby the member is not subject to wear and replacement as with conventional gauges.

Still another object of the present invention is to provide a versatile stair tread and riser gauge which includes a minimum number of parts, is convenient to operate, is durable and long lasting, yet is relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a plan view of the stair tread and riser gauge of the present invention with phantom views of one of the sizing assemblies in various positions.

FIG. 2 is an enlarged sectional view taken along section 2—2 of FIG. 1.

FIG. 3 is a partial perspective view of the gauge of the present invention being utilized to make a typical cut with a portable saw.

FIG. 4 is an enlarged sectional view taken substantially along section 4—4 of FIG. 3.

FIG. 5 is a sectional view of a corner of one of the sizing assemblies associated with the gauge of the present invention taken substantially along section line 5—5 of FIG. 1.

FIG. 6 is a perspective view of the tab shown in FIG. 5.

FIG. 7 is a perspective view of a typical clamp utilized to hold the gauge of the present invention to the workpiece being cut.

Referring now, more particularly, to FIGS. 1 and 2 of the drawings, the stair tread and riser gauge of the present invention is generally indicated by the numeral 10 and includes a telescopic framework comprised of a pair of rigid arms 12 and 14 adjustably mounted to each other. Preferably, arm 12 is received in a channel formed in the lower side of arm 14 and is slidable therein. Arm 12 includes an elongated slot 16 extending along a substantial length thereof and receives a threaded fastener 18 with a wing nut 20, or the like mounted thereto. The wing nut may be conveniently loosened to permit adjustment of the length of the telescopic framework, as hereinafter explained.

A pair of sizing and guide assemblies generally indicated by the numerals 22 and 24 are mounted to opposite end portions of the telescopic framework by way of bolts 26 and 28, respectively. Each assembly includes a stationary member 30 and a movable member 32 pivotally connected to the stationary member by way of a hinge 34, or similar fastening means. During the measuring or sizing operation, the telescopic frame is adjusted in length until outer edges 36 of movable members 32 abut the surfaces of the opposite skirts of a staircase being measured. The skirts are shown in phantom at 38 in FIGS. 1 and 2. Preferably, the lower surfaces of each movable member 32 are of generally planar configuration and rest upon the staircase horses indicated in phantom at 40. When the outer edges 36 of the movable members 32 are in firm contact with the appropriate surfaces of the staircase skirts 38, wing nut 20 is tightened to lock the telescopic frame arms 12 and 14 relative to each other. Preferably, bolts 26 and 28 provide a pivotal connection for sizing assemblies 22 and 24, whereby they may be selectively pivoted relative to arms 12 and 14 to permit measuring or sizing between nonparallel staircase skirts. Such a pivotal movement of assembly 22 is indicated in phantom at 42. Of course, it is not intended that the invention be limited to such a pivotal connection between the sizing assemblies and telescopic framework, and if desired, the sizing assemblies may be permanently affixed to arms 12 and 14 of the telescopic framework.

Preferably, each movable member 32 is comprised of upper and lower elements 44 and 46 of generally planar configuration. Element 44 is provided with a plurality of adjustment slots 48 which adjustably receive mounting bolts 50 attached to lower element 46. This permits fine adjustment of the positions of the upper and lower elements relative to each other to further enhance the overall versatility of the present invention.

Once the telescopic framework has been adjusted to properly position the outer edges of the sizing assemblies against the staircase skirts, the gauge is removed from between the stair skirts and appropriately fastened to the piece of wood or other material from which the stair tread or riser is to be cut. The cutting operation is best illustrated in FIGS. 3 and 4, wherein a typical portable power saw is indicated at 52 for cutting the piece of wood indicated at 54. The power saw is provided with a circular blade 56 and a slide shoe 58 of generally planar configuration. Prior to beginning a cut, one of the movable members 32 is pivoted upwardly to a cutting position illustrated in FIGS. 3 and 4. In this position, the movable member generally overlies the associated stationary member 30 and is entirely removed from its initial measuring position, whereby the saw slide shoe may pass over the surface of the wood to be cut, movement of the saw being uninhibited by movable member 32. When either of the movable members is pivoted to its cutting position, a guide edge 60 of the associated stationary member is exposed and provides a guide which is slidably engaged by a corresponding edge on the power saw's slide shoe 58. It is important to note that each movable member 32 is of a width W, illustrated in FIG. 4, which is equal to the dimension between saw blade 56 and the outer guide edge of the associated slide shoe 58. Thus, when the edge of the slide shoe is moved along the guide edge 60 of stationary member 30, the saw blade follows a path to make a cut in the workpiece at the proper position. Cuts are made at both ends of the gauge while maintaining the gauge clamped to the wood or workpiece. This provides a stair tread or riser of the exact dimensions to fit snugly between the staircase skirts.

With reference to FIGS. 5 and 6, it will be observed that the gauge of the present invention may be provided with positioning tabs 62 which are adjustably fastened to the lower element 46 of each movable member 32 to further aid in positioning the gauge relative to the workpiece prior to making the end cuts. Preferably, each tab is held in place by way of a screw 64 which is in threaded engagement with lower element 46 and cooperates with a slot 68 formed in the tab. Each tab is provided with a downwardly extending portion 66 which engages the edge surfaces of the workpiece. The elongated slot of each tab permits the tab to be adjusted relative to the corresponding lower element 46 in order to accommodate workpieces of different widths.

With reference to FIG. 7, it will be appreciated that an appropriate clamp generally indicated by the numeral 70 may be utilized to hold the gauge of the present invention firmly in place to the workpiece during cutting. Such a clamp includes a pair of rigid bracket members 72 and 74 joined together by way of an adjustment nut 76 which may be adjusted to change the spacing between the bracket members. A clamp handle 78 is pivotally mounted to bracket member 74 and is provided with a cam surface 80 which presses tightly against a portion of the gauge or workpiece when the handle is pivoted downwardly to the position illustrated. Of course, it is not intended that the invention be limited to the use of such a clamp illustrated in FIG. 7, and other appropriate fastening means may be utilized, as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stair tread and riser gauge for use with a portable power saw of the type having a slide shoe with a guide edge spaced from and paralleling a cutting edge, said gauge including an elongated framework having opposite end portions and means for adjustably varying the effective length of said framework between said opposite end portions, a pair of generally co-planar plate-like sizing assemblies mounted on opposite end portions of said framework, at least one of said assemblies including a first base plate portion including an outer edge portion generally transverse to the longitudinal extent of said framework, said base plate portion being pivotally supported from the corresponding framework end portion for adjustable angular positioning relative to said corresponding framework end portion about an axis extending transverse to the longitudinal extent of said framework and disposed substantially normal to said sizing assemblies, said sizing assemblies including remote gauge edge portions disposed transverse to said axis and the longitudinal extent of said framework, a shiftable plate portion including opposite edge portions generally paralleling each other, one of said opposite edge portions of said shiftable plate portion being hingedly supported from said outer edge portion for angular displacement of said shiftable plate portion relative to said base plate portion about an axis generally paralleling said outer edge portion between an inactive position overlying said base plate portion and retracted above said outer edge portion and an active position with said shiftable plate forming an outward generally co-planar extension of said first base plate portion, the gauge edge portion of said one assembly being supported from said shiftable plate portion on the side thereof opposite from said one opposite edge portion, said gauge edge portion and said outer edge portion of said one assembly, when said one assembly is in its active position, being spaced apart a distance corresponding to the spacing between the guide edge of the slide shoe and the cutting edge of the saw.

2. The combination of claim 1 wherein the other of said assemblies also includes a base plate portion and a shiftable plate portion pivotally supported therefrom corresponding to the base plate and shiftable plate portions of said one assembly.

3. The combination of claim 2 wherein the base plate portion of said other assembly is also pivotally supported from the corresponding framework end portion for adjustable angular positioning relative to said framework about an axis transverse to the longitudinal extent of said framework and generally normal to said sizing assemblies.

4. The combination of claim 1 wherein said gauge edge portion of said one sizing assembly comprises one straight edge portion of a plate member shiftably supported from said shiftable plate portion for adjusted extension and retraction relative to said second opposite edge portion and at least slightly angularly adjustable relative to said second opposite edge portion in the plane of said plate member.

5. The combination of claim 1 wherein said opposite end portions of said framework include adjacent adjustably overlapped end portions.

* * * * *